United States Patent Office 2,911,081
Patented Nov. 3, 1959

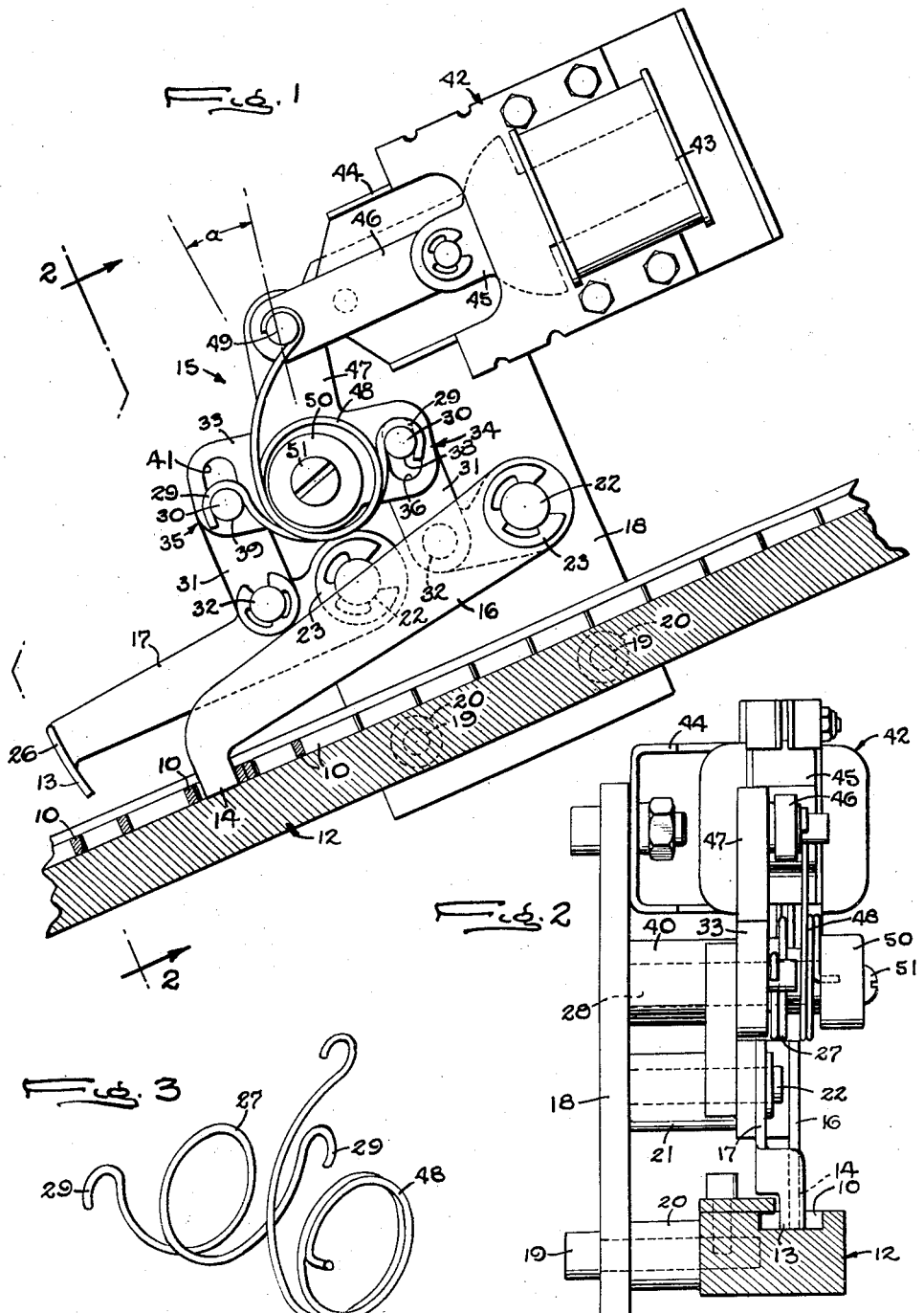

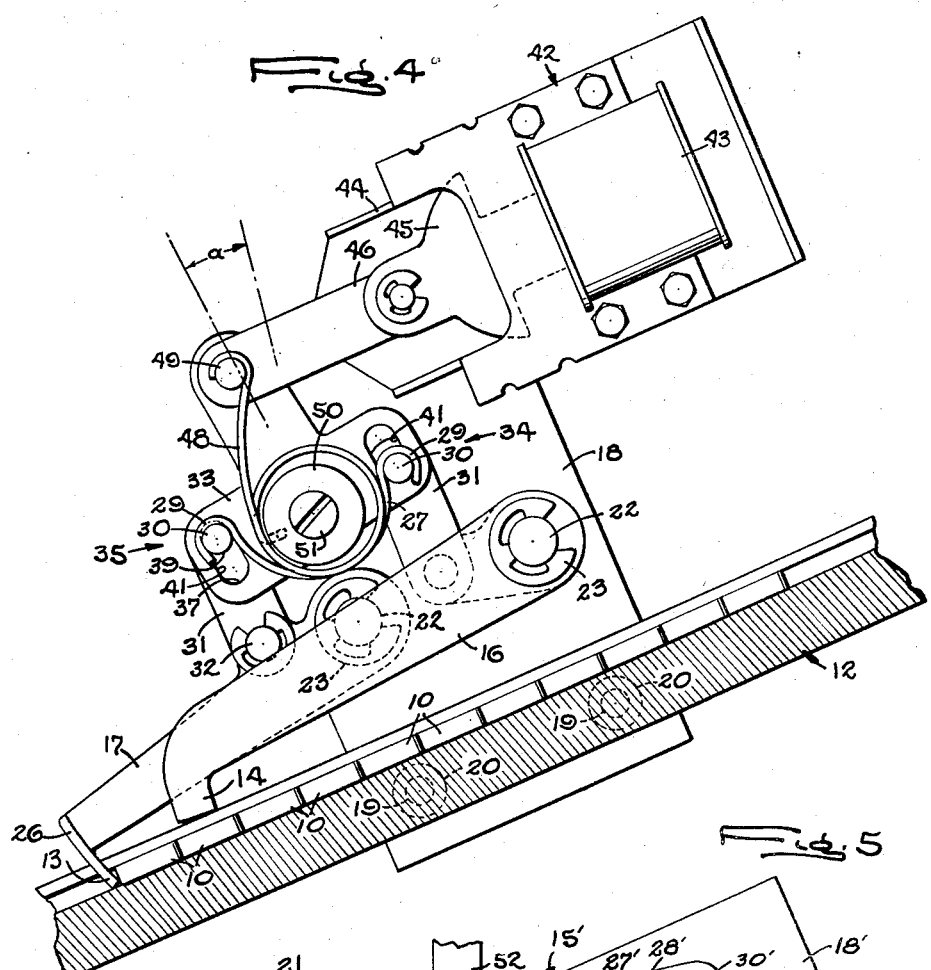

2,911,081

FEED CONTROL MECHANISM

Paul H. Dixon, Rockford, Ill., assignor to Dixon Automatic Tool, Incorporated, Rockford, Ill., a corporation of Illinois Application October 10, 1956, Serial No. 615,125

7 Claims. (Cl. 193—40)

This invention relates generally to feeding mechanisms for controlling the advance of workpieces in a row and releasing the workpieces one at a time for continued advance along a predetermined path. More particularly, the invention relates to a parts escapement of the type having two pawls with actuating means for shifting the same alternately toward and away from the workpiece path and into and out of contact with successive workpieces to transfer control of the row back and forth between the pawls and thereby release the end workpiece in the row.

The general object of the invention is to provide a novel parts escapement mechanism which comprises few parts of simple construction and low cost, which is readily adaptable for operating on workpieces of widely varying sizes and shapes, and which is positive and reliable in its feeding action to enable workpieces to be fed at a rapid rate.

Another object is to accommodate workpieces of different sizes and shapes without substantial adjustment and rearrangement of parts by a novel mounting of the pawls for yielding movement relative to each other.

A further object is to connect the pawls to a common operating member in a novel manner permitting the pawls to move different distances to accommodate workpieces of different thicknesses transversely of the workpiece path while the stroke of the operating member remains constant.

A more detailed object is to couple the pawls and the operating member by novel connections which permit yielding movement of the pawls toward the workpiece path and provide positive movement of the pawls away from the path.

The invention also resides in the novel construction of the pawls as parts of levers which are mounted in such a manner as to facilitate adaptation of the same actuating mechanism to workpieces of different lengths along the path.

Other objects and advantages of the invention will become apparent from the following detailed description taken in connection with the accompanying drawings, in which Figure 1 is a side elevational view of a preferred form of escapement mechanism embodying the novel features of the present invention, the work supporting track being shown in section.

Fig. 2 is a sectional view taken along the line 2—2 of Fig. 1.

Fig. 3 is an exploded perspective view of the actuating springs.

Fig. 4 is a view similar to Fig. 1 showing the parts in different positions.

Fig. 5 is a view similar to Fig. 1 of a modified mechanism.

Fig. 6 is a perspective view of one pawl.

The invention is shown in the drawings for purposes of illustration embodied in a feed control mechanism for releasing in groups of one or more a plurality of workpieces such as washers 10 (Fig. 1) or flat recessed parts 11 (Fig. 5) advancing edge to edge in a row along a downwardly inclined track 12. Generally, the mechanism comprises two pawls 13 and 14 spaced apart along the track and each movable transversely of the latter between an advanced position in which the pawl engages a workpiece in the row to block advance of that workpiece and those behind it and a retracted position spaced from the track and the workpieces to permit the latter to slide along the track past the pawl. Each pawl is retracted while the other pawl is advanced so that, depending on the spacing of the pawls in relation to the dimension of the workpieces along the track, one or more workpieces at the leading end of the row are released when the pawls are shifted alternately into their advanced positions. Herein, the pawls are spaced apart to release only the leading workpiece in the row.

In accordance with the present invention, the pawls 13 and 14 and actuating means 15 therefor are constructed and arranged in a novel manner to render the feeding mechanism adaptable with few adjustments to workpieces of different sizes and shapes and to a wide variety of work supporting and advancing means such as the track 12. To this end, each pawl is mounted for movement toward and away from the track individually of the other pawl and is shifted toward its advanced position with a yieldable force. Each pawl then may dwell in its advanced position until the other pawl reaches its advanced position without precise location of the pawls relative to the track. Also, the pawls may advance different distances under the action of the same actuating means to accommodate workpieces varying in thickness transversely of the track and to contact improperly positioned workpieces without damaging the same. Adaptability to variations in the dimensions of workpieces lengthwise of the track is obtained by mounting at least one of the pawls on a member 16 elongated longitudinally of the track and constructed for location of the associated pawl thereon at different points along the length of the member. The versatility of the feed mechanism preferably is increased by providing two such elongated members 16 and 17, one for each pawl.

The various parts of the feed mechanism are assembled as a unit and, in this instance, are supported on a plate 18 secured in a vertical position along one side of the track 12 by bolts 19 extending through spacer sleeves 20. To simplify the construction, the elongated members 16 and 17 are formed as levers fulcrumed separately on the plate for swinging toward and away from the track in planes paralleling the plate. Each lever herein is cast as a flat bar having an integral sleeve 21 projecting laterally from its rear end portion and journaled on a stub shaft 22 rigid with and projecting horizontally from the plate above the track to define the lever fulcrum, the two shafts being spaced apart longitudinally of the track. To enable the rear lever 16 to swing past the projecting end of the front stub shaft 22, the rear shaft and the rear sleeve 21 thereon are longer than the front shaft and sleeve. Suitable snap rings 23 fitting into annular grooves (not shown) adjacent the ends of the shafts retain the lever sleeves on the shafts. In this instance, the spacer sleeves 20 are of such length that the plane of the rear lever extends along the center of the row of workpieces 10.

Each of the pawls 13 and 14 herein is cast integral with its supporting lever as a depending projection. To enable the rear pawl 14 to be spaced different distances from the front pawl so as to accommodate workpieces of different lengths, it extends along a major portion of the length of the rear lever 16 as shown in Fig. 6 when this lever is cast. A rear portion of the pawl then is cut away as indicated along a dotted line 24 in Fig. 6 to accommodate relatively short workpieces such as the washers 10 of Figs. 1, 2 and 4. For a greater spacing of the pawls as is desired for operating on longer workpieces such as the recessed parts 11 of Fig. 5, both front and rear portions of the rear pawl are cut away as shown by dot-dash lines 25 in Fig. 6 and the pawl is shaped to fit into the recesses. The front pawl 13 in this instance is formed as the lower depending end of the front end portion 26 of the lever 17 which is bent laterally to dispose the pawl in the plane of the rear lever 16 along the center of the row of workpieces.

The actuating means 15 for shifting the pawls 13 and 14 alternately toward and away from the track 12 in this instance derives the force for yieldably advancing each pawl from a helically coiled spring 27 common to both pawls and encircling a stub shaft 28 projecting rigidly and horizontally from the supporting plate above the stub shaft 22 for the front pawl. Opposite end portions 29 of the spring are curled around pins 30 projecting rigidly from the upper ends of two links 31 which, at their lower ends, are pivotally connected at 32 to the respective pawl levers at points spaced along the track from the fulcrum shafts 22. The spring end portions 29 extend over the tops of the pins 30 and act through the latter and the links to urge the levers and therefore the pawls downwardly toward the track.

Movement of the pawls alternately away from the track against the action of the spring 27 preferably is effected by a common operating member 33 forming a part of the actuating means 15 and shiftable back and forth on the supporting plate 18. Each of two individual connections 34 and 35 between this member and the respective pawl levers 16 and 17 has a lost motion which permits movement of the associated pawl to its advanced position when the member is shifted in one of its directions but which is taken up to establish a positive connection between the member and the pawl to shift the latter to its retracted position when the member is shifted in the opposite direction. Such lost motion is provided herein by two abutments 36 and 37 formed on the member and facing in the opposite directions of movement thereof to oppose abutments 38 and 39 movable with the respective pawl levers. In this instance, the lever abutments are the undersides of the pins 30 and the operating member is a straight lever having a laterally projecting sleeve 40 disposed intermediate its ends and journaled on the upper stub shaft 28. Vertically elongated slots 41 extending circumferentially of the lever on opposite sides of the sleeve receive and guide the respective link pins 30, the lower ends of these slots constitute the operating abutments 36 and 37.

In the preferred feeding mechanism of Figs. 1, 2 and 4, the pawl actuating means 15 includes a power operator 42 mounted on the supporting plate 18 and forming a part of the unitary feeding assembly. Herein, this operator is a solenoid having an armature 45 and a coil 43 secured by a bracket 44 to the supporting plate 18. The armature is connected to the operating lever 33 through a link 46 which is pivotally connected at opposite ends to the armature and to an arm 47 integral with and upstanding from the lever 33 to form a double bell crank. Upon energization of the coil, the armature is attracted against the core and to the right as viewed in Fig. 1 to shift the bell crank clockwise for movement of the front pawl abutments 37 and 39 toward each other and the rear pawl abutments 36 and 38 away from each other. The bell crank and the armature are shifted in the opposite direction when the coil is deenergized by a coiled return spring 48 encircling and having one end curled around and acting on a pin 49 joining the outer end of the bell crank arm 47 and the armature link 46. The other end of the return spring is anchored in a collar 50 secured to the outer end of the upper stub shaft 28 by a screw 51 which permits angular adjustment of the collar on the shaft and thereby variation of the force exerted by the spring on the armature.

To prepare the preferred feeding mechanism for operation, the supporting plate 18 is secured to the track 12 in such a position that the planes of swinging of the pawls 13 and 14 include the path of the washers 10. Also, both the rear pawl abutments 36 and 38 and the front pawl abutments 37 and 39 are spaced from each other with the pawls contacting the track and with the operating lever 33 in an intermediate range indicated at a between the limit positions determined by the stroke of the armature 45 as shown in Figs. 1 and 4. With this arrangement, the front pawl abutments 37 and 39 separate to permit the pawl spring 27 to urge the front pawl to its advanced position against the track as shown in Fig. 4 when the coil 43 is deenergized for shifting of the bell crank to its counterclockwise limit position by the return spring 48. In this same movement of the bell crank, the rear abutment 36 thereon is raised toward the abutment 38 on the rear pin 30 to take up the lost motion and establish a positive connection between the bell crank and the rear pawl 14 for swinging the latter to its retracted position above the washers 10 as shown in Fig. 4. The washers thus are free to slide down along the track 12 until the leading washer abuts the front pawl 13.

Release of the leading washer in the row behind the front pawl is effected by successive energization and deenergization of the solenoid coil 43. When the latter is energized to rock the bell crank 33 clockwise, the rear abutment 36 thereon shifts toward the track to permit the pawl spring 27 to urge the rear pawl in the same direction to its advanced position against the track 12 and within the hole in the washer 10 adjacent the leading one in the row as shown in Fig. 1. The front bell crank abutment 39 at the same time is shifting upwardly toward the abutment 37 on the front pin 30 to take up the lost motion in the connection 35. The front abutments do not contact each other for retraction of the front pawl 13, however, until the bell crank moves beyond its intermediate range a after the rear pawl has reached its advanced position. With the front abutments contacting each other in the final part of the armature stroke, the front pawl 13 is raised above the leading washer and the latter thereby is released to slide down the track past the front pawl and away from the remainder of the washers held by the rear pawl.

Upon deenergization of the coil 43, the bell crank 33 moves reversely or counterclockwise under the action of the return spring 48. Again, both pawls dwell in their advanced positions as the bell crank moves through the intermediate range a. In the final return movement of the crank beyond this range, the rear crank abutment 36 engages the rear pin 30 to raise the rear pawl above the washers and the entire row slides down the track and against the front pawl thereby completing the release cycle.

Rather than including a power operator such as the solenoid 44, the pawl actuating means 15 may be adapted for connection with an external part such as a rod 52 which oscillates transversely of the track. Such a construction is shown in Fig. 5 in which the parts corresponding to those of Figs. 1, 2 and 4 bear similar but primed reference characters. The modified feed mechanism is similar to the preferred one in the mounting and arrangement of the pawls 13' and 14' and the operating lever 33' but differs in the omission of the upstanding arm of the lever and in extension of the latter beyond one end to form a projection 53 which is slotted at 54 to receive a pin 55 projecting from the oscillating rod 52. Another difference in the modified construction is the length of the rear pawl lever 16' which, because each of the flat recessed parts 11 extends farther along the track 12' than each of the washers 10 of Figs. 1 and 4, is made shorter than the preferred rear pawl lever 16 to space the rear pawl 14' farther behind the front pawl for entry into the recess in the part 11 next to the leading part while the latter abuts the front pawl. As described above, the modified rear pawl lever may be formed simply from a blank like that of Fig. 6 by cutting the same along the dotted lines 25. The operation of the modified construction during oscillation of the rod 52 is similar to that of the preferred construction described above except that, the rear pawl 14' travels a shorter distance to its advanced position and abuts the bottom of the recess in each part 11 rather than the track 12 as in the preferred construction.

It will be apparent that, by mounting the pawls 13 and 14 for individual movement relative to each other and yieldably urging them toward the track 12, each pawl may dwell in its advanced position during shifting of the other pawl to its advanced position and may advance different distances toward the track. Thus, the pawls abut the track or workpiece surfaces facing away from the track to accommodate workpieces of different thicknesses without fine adjustments of the pawls relative to the track or deformation of the latter to permit either pawl to advance beyond the workpieces thereon. Also, either pawl may yield to prevent damage to a workpiece improperly positioned on the track. Due to support of the pawls on the levers 16 and 17, which extend along the track, workpieces of different lengths are accommodated easily by forming the rear lever 16 in a particular shape to provide the desired spacing of the pawls along the track. One feed mechanism constructed as described above was capable of operating on workpieces as thin as .020 of an inch and of releasing workpieces at the rate of 200 per minute.

I claim as my invention:

1. In escapement mechanism for feeding a plurality of parts one at a time along a predetermined path, the combination of a support fixed relative to said path, a first lever fulcrumed on said support and extending along and movable toward and away from said path, a second lever fulcrumed on said support and extending along and movable toward and away from said path independently of said first lever, first and second pawls carried by said first and second levers respectively and spaced apart along said path to engage said parts as the latter advance along the path, yieldable means acting on said levers to urge said pawls toward said path, an operating member mounted on said support to shift back and forth in opposite directions, a connection between said operating member and said first lever having a lost motion taken up by shifting of the member in one of said directions and operable, when the lost motion is taken up, to shift said first pawl positively away from said first path against the action of said yieldable means, and a similar lost motion connection between said member and said second lever for shifting said second pawl positively away from said path by shifting of the member in the other of said directions whereby each of the pawls alternately is shifted away from said path and is released to move toward the path upon shifting of the member back and forth.

2. In escapement mechanism for feeding a plurality of parts one at a time along a predetermined path, the combination of a support fixed relative to said path, two pawls spaced along said path and each mounted on said support for movement toward and away from said path relative to and independently of the other pawl, yieldable means urging each of said pawls toward said path, a lever fulcrumed on said support, a pair of opposing abutments connected to and movable respectively with said lever and one of said pawls for movement toward and into contact with each other to establish a positive connection between the lever and the pawl for shifting of the latter away from said path upon swinging of the lever in one direction about its fulcrum and away from each other to permit the pawl to shift toward said path under the action of said yieldable means upon swinging of the lever in the opposite direction, and a second pair of similar abutments connected to and movable respectively with said lever and the other of said pawls for movement into contact with each other to shift the pawl away from said path upon swinging of the lever in said opposite direction and away from each other to permit the pawl to shift toward said path under the action of said yieldable means upon swinging of the lever in said one direction.

3. In escapement mechanism for feeding a plurality of parts one at a time along a predetermined path, the combination of a support fixed relative to said path, two pawls spaced along said path and each mounted on said support for movement toward and away from said path relative to and independently of the other pawl, yieldable means urging each of said pawls toward said path, an operating member mounted on said support for movement back and forth in opposite directions relative to the support, a pair of opposing abutments connected to and movable respectively with said member and one of said pawls for movement toward and into contact with each other to establish a positive connection between the member and the pawl for shifting of the latter away from said path upon shifting of the member in one of said directions and away from each other to permit the pawl to shift toward said path under the action of said yieldable means upon shifting of the member in the opposite direction, and a second pair of similar abutments connected to and movable respectively with said member and the other of said pawls for movement into contact with each other to shift the pawl away from said path upon shifting of the member in said opposite direction and away from each other to permit the pawl to shift toward said path under the action of said yieldable means upon shifting of the member in said one direction.

4. In escapement mechanism for releasing a plurality of parts one at a time for advance along a predetermined path, the combination of a support fixed relative to said path, first and second pawls spaced apart along said path and each mounted on the latter to move toward and away from the path independently of and relative to the other pawl, yieldable means urging each of said pawls toward said path, an operating lever fulcrumed on said support, a connection between said lever and one of said pawls having a lost motion taken up by swinging of the lever in one direction about its fulcrum and operable, when the lost motion is taken up, to shift the pawl positively against the action of said yieldable means and away from said path, and a connection between said lever and the other of said pawls having a lost motion taken up by swinging of the lever in the opposite direction about said fulcrum and operable, after the lost motion is taken up, to shift the other pawl positively against the action of said yieldable means and away from said path whereby the pawls are shifted away from said path and released to move toward the path upon rocking of said lever back and forth in said opposite directions.

5. In escapement mechanism for feeding a plurality of parts one at a time along a predetermined path, the combination of a support fixed relative to said path, first and second pawls spaced apart along said path and each mounted on said support for movement toward and away from the path relative to and independently of the other pawl, yieldable means urging each of said pawls toward said path, an operating member mounted on said support to shift back and forth in opposite directions, a connection between said operating member and said first pawl having a lost motion taken up by shifting of the member in one of said directions and operable, when the lost motion is taken up, to shift the pawl positively away from said first path against the action of said yieldable means, and a similar lost motion connection between said member and said second pawl for shifting the pawl positively away from said path by shifting of the member in the other of said directions whereby each of the pawls alternately is shifted away from said path and is released to move toward the path upon shifting of the member back and forth.

6. The combination of claim 5 in which at least one of said pawls is supported by an elongated member extending along said path and projects laterally from such member and toward the path.

7. The combination of claim 5 in which the mounting for at least one of said pawls comprises an elongated arm extending longitudinally of said path and pivoted on said support to swing toward and away from the path and the pawl projects laterally from the arm and toward the path.

References Cited in the file of this patent
UNITED STATES PATENTS

| | | |
|---|---|---|
| 2,249,529 | Knights | July 15, 1941 |
| 2,470,707 | Leston et al. | May 17, 1949 |
| 2,662,626 | Graham et al. | Dec. 15, 1953 |